Patented Oct. 8, 1935

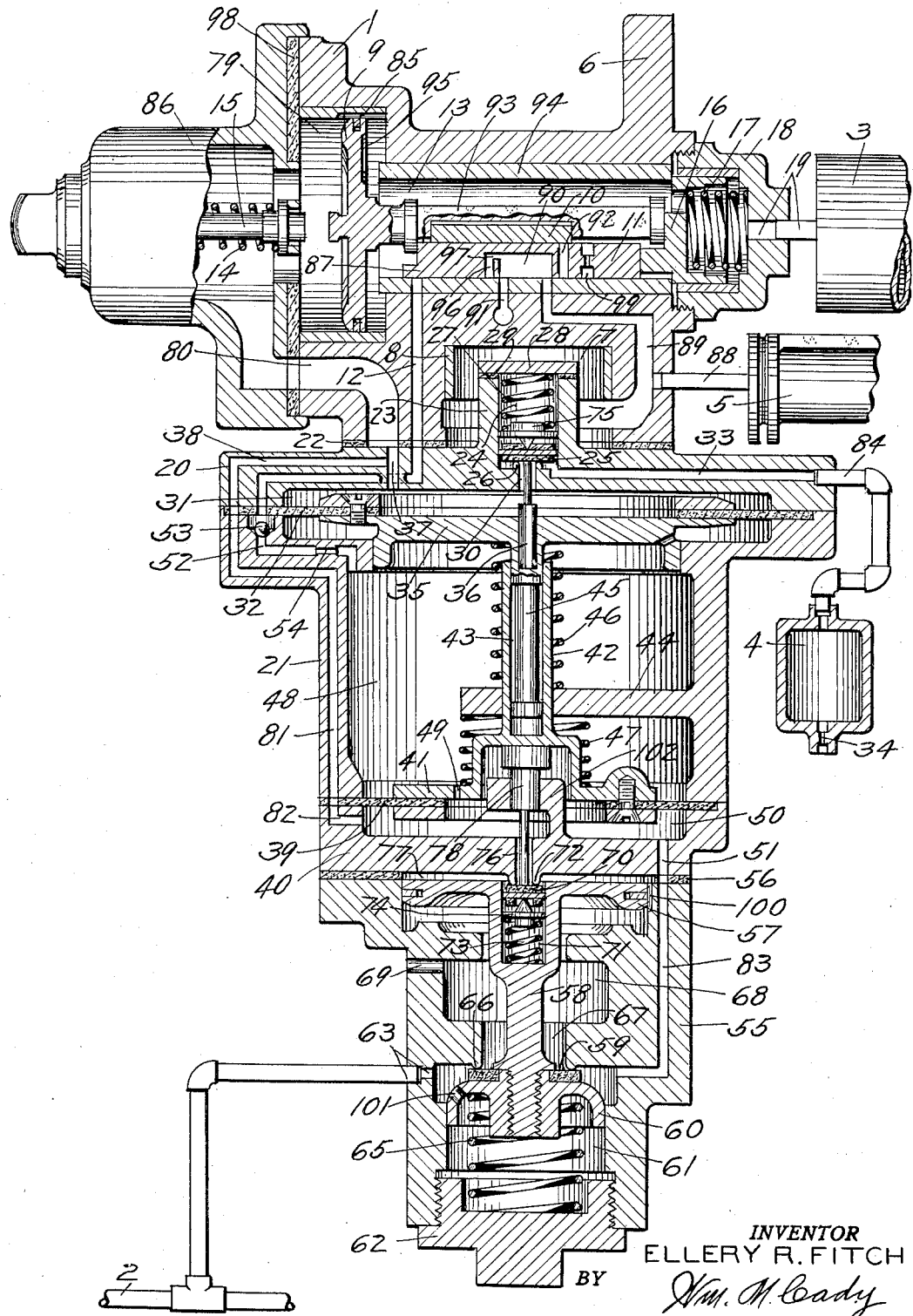

2,016,408

UNITED STATES PATENT OFFICE 2,016,408

FLUID PRESSURE BRAKE

Ellery R. Fitch, Edgewood, Pa., assignor to The Westinghouse Air Brake Company, Wilmerding, Pa., a corporation of Pennsylvania Application October 11, 1932, Serial No. 637,265

11 Claims. (Cl. 303—35)

This invention relates to automatic fluid pressure brake systems in which the brakes are applied by effecting a reduction in brake pipe pressure and more particularly to a system of the type disclosed in the patents of Ellery R. Fitch and Earl S. Cook, No. 1,974,954, issued September 25, 1934, and Ellery R. Fitch, No. 1,943,593, issued Jan. 16, 1934, and Earl S. Cook No. 1,980,322, issued Nov. 13, 1934.

In the handling of long trains, it is highly desirable to apply the brakes on cars at the rear end of the train as nearly as possible in synchronism with the application of the brakes on the cars at the head end of the train, so as to prevent slack in the train from running in at such a rate as to cause excessive and damaging shocks.

As pointed out in each of the above mentioned patents, in order to accomplish this result, a fluid pressure brake system is provided which embodies means located on the locomotive for effecting successive reductions in brake pipe pressure and which embodies sensitive and yet stable means located on cars of the train which are responsive to each reduction in brake pipe pressure, effected through the operation of the means on the locomotive, for effecting successive local reductions in brake pipe pressure.

Whereas, in the above mentioned patents, the aforementioned sensitive brake pipe venting means on the cars comprises a valve device separate from the triple valve device, the principal object of my invention is to modify the K type of triple valve so as to include, as a part of the triple valve structure, the brake pipe venting device, thereby facilitating and reducing the cost of installation, due to the elimination of piping, which would otherwise be necessary, and effecting a quicker response of the triple valve device to the local venting of brake pipe pressure because of the close proximity of said vent valve device to said triple valve device.

Another object of my invention is to provide an improved quick action mechanism which may be combined with the aforementioned brake pipe venting device and thus be applied to a K type of triple valve without complicated or costly alterations to the triple valve device.

Other objects and advantages will appear in the following more detailed description of the invention.

In the accompanying drawing, the single figure is a diagrammatic view, mainly in section, of a fluid pressure brake equipment including a modified K type of triple valve device embodying my invention.

As shown in the drawing, my improved equipment may comprise a modified K triple valve device 1, a brake pipe 2, an auxiliary reservoir 3, a quick service reservoir 4 and a brake cylinder 5.

In modifying the K triple valve device, the check valve casing, check valve mechanism, and the quick action mechanism are removed from the triple valve casing 6, leaving the chamber 7, which contained the quick action mechanism, open at one end. The quick action piston bushing 8, mounted in the casing 6, may be retained although it is not used.

The old triple valve piston 9 and graduating valve 10 are used without change and the old main slide valve 11 is modified by cutting away a portion of the front end at 87, so that said valve will uncover the old quick service passage 12 in the casing 6 when said slide valve is in retarded release position, thereby opening said passage to the slide valve chamber 13 in said position, as will be explained hereinafter. These valves are adapted to be operated in the usual manner through the medium of the piston stem 93.

The slide valve chamber 13 is open, in the usual manner, through a passage and pipe 19 to the auxiliary reservoir 3.

The old bushing 94, which provides a seat for the main slide valve 11, is retained without change.

The old piston chamber cap 86, carrying the graduating spring 14 and stop 15, is used without change and is secured, in its original position, to the casing 6 in the usual manner.

The retarded release stop 16 and retarded release spring 17 are used without change and are contained in the old cage member 18, which has screw-threaded connection with the triple valve casing 6.

The quick service mechanism is new and comprises a filler member 20 clamped between a casing 21 and the surface of the triple valve casing 6 from which the check valve casing has been removed, a gasket 22 being interposed between said surface of the triple valve casing and said filler member. The filler member may have a projecting portion 23 extending into the chamber 7 and provided with a chamber 24 which contains a valve 25, normally held seated on an annular seat rib 26 at one end of the chamber 24 by the light pressure of a coil spring 27 acting through the medium of a follower 75, the spring and follower being contained in the chamber 24 and interposed between said valve and a cover plate 28 at the outer end of said projecting portion, a gasket 29 being interposed between said cover plate and said projecting portion. The valve 25 is adapted to control communication, through a passage 30, from a chamber 31 above a diaphragm 32, which will be referred to hereinafter, to a passage 33 leading through a pipe 84 to the quick service reservoir 4, said reservoir having a restricted atmospheric port 34, so that fluid can vent from said reservoir at all times at a rate as determined by the flow area of the port 34.

The quick service mechanism also comprises a flexible diaphragm 32 for controlling the operation of the valve 25, said diaphragm being clamped between the filler member 20 and the casing 21 and having a follower plate 35. A pin 36, carried at one end by said follower plate, the other end extending through the passage 30, is adapted to engage the valve 25 for unseating said valve.

Chamber 31, formed in the filler member 20, above the diaphragm 32, is connected through a passage 37 to a passage 38 which leads to the brake pipe 2, as will be hereinafter explained.

The quick action mechanism comprises a flexible diaphragm 39 clamped between the casing 21 and a filler member 40, said diaphragm being preferably concentrically disposed with reference to the diaphragm 32. The diaphragm 39 has a follower plate 41 which, in the present embodiment, is provided with a stem 42 slidably extending through a suitable opening in a rib 44 carried by the casing 21 for maintaining the stem and diaphragm in alignment. The stem 42 is provided with a central bore 43 for slidably receiving a stem 45 of the diaphragm follower 35, for maintaining the diaphragm 32 in alignment with the stem 42. Thus, it will be seen that guide means are associated with the diaphragms 32 and 39, which cooperate to maintain said diaphragms in alignment, and that, because of the telescoping arrangement of said means, said diaphragms are adapted to move independently of each other.

Interposed between the rib 44 and the diaphragm follower plate 35 is a spring 46, and between said rib and the diaphragm follower plate 41 is a spring 47, which springs act to normally maintain the diaphragms 32 and 39, respectively, in the positions in which they are shown in the drawing.

Intermediate the diaphragms 32 and 39 is a chamber 48 which is in communication through a small hole 49 in the follower plate 41 with a chamber 50, formed in the filler member 40, below the diaphragm 39, said chamber being connected through a passage 51 to the brake pipe 2, as will be hereinafter described.

A passage 52, connected to the chamber 48, communicates with a passage 12 leading to the seat of the main slide valve 11, the passage 12 being controlled by the main slide valve 11 for permitting flow of fluid from said chamber to the slide valve chamber 13 when said slide valve is in retarded release position, as will be hereinafter described. The passage 52 is provided with a check valve 53 for preventing back flow of fluid from the slide valve chamber 13 to the chamber 48 and a choke 54 is provided in said passage for controlling the flow of fluid through said passage in case the check valve 53 should accidentally remain unseated. The passage 12 which extends through the triple valve casing 6 is the old quick service passage.

The quick action mechanism may also comprise a casing 55 which clamps the filler member 40 to the casing 21, a gasket 56 being interposed between the casing 55 and said filler member. Contained in the casing 55 is a piston 57 having a stem 58 carrying a vent valve 59 which is secured to the stem by a guide member 60 having screw-threaded connection with the stem, said member slidably engaging the casing 55 within a chamber 61. The open end of the chamber 61 is closed by a cap nut 62 having screw-threaded connection with the casing 55.

The vent valve chamber 61 is open to the brake pipe 2 through an opening 101 in the guide member 60 and a passage and pipe 63 and contains a spring 65 which is interposed between and engages the cap nut 62 and one side of the guide member 60 and which acts, through the medium of the guide member, to normally maintain the vent valve 59 seated on an annular seat rib 66 formed on the casing 55, so as to normally maintain closed a communication from the valve chamber 61, and consequently from the brake pipe passage 63, to a passage 67 leading to the atmosphere by way of a chamber 68 at one side of the vent valve piston and a passage 69.

In the present embodiment of the invention, a valve 70 is slidably guided within a central bore 71 in the piston stem 58, and is normally held seated on an annular seat rib 72, carried by the filler member 40, by a spring 73 acting through the medium of a follower 74, the spring and follower being contained in the bore 71.

The valve 70 controls communication between a passage 76 leading to the quick action diaphragm chamber 50 and the vent valve piston chamber 77. The operation of the valve 70 is in turn controlled by the quick action diaphragm 39 through the medium of a plunger 78 which is slidably mounted in an extended portion 102 carried by the filler member 40.

With the various parts assembled as described in the foregoing, the chamber 79, at one side of the piston 9, is connected to the brake pipe 2 through the old brake pipe passage 80 in the triple valve casing 6, a registering passage 37 in the filler member 20 which connects with a passage 38 which in turn registers with a passage 81 in the casing 21 leading through a passage 82 in the filler member 40 to the chamber 50 and thence through the passage 51 in the filler member 40 and a registering passage 83 in the casing 55 to the vent valve chamber 61 and from there through the passage and pipe 63.

The locomotive equipment has not been illustrated in the drawing, but it will be understood that this equipment may be substantially the same as that fully described in the aforementioned Patent No. 1,974,954, in which successive reductions in brake pipe pressure are effected automatically, or in the aforementioned Patent 1,980,322, in which the successive reductions in brake pipe pressure are controlled manually. In the following description of the operation of the equipment, it will be assumed that the locomotive equipment is the same as that disclosed in the above first mentioned patent.

In operation, when the brake valve device (not shown) is in running position, the brake pipe 2 is maintained charged with fluid at feed valve pressure in the manner described in said patent. Fluid under pressure thus supplied to the brake pipe flows therefrom to the triple valve piston chamber 79 by way of pipe and passage 63, chamber 61, passages 83 and 51, chamber 50, and passages 82, 81, 38, 37 and 80. With the triple valve parts in normal release position, as shown in the drawing, fluid under pressure supplied to the triple valve piston chamber 79 flows through a feed groove 85 around the piston 9 to the valve chamber 13 and from thence flows through passage and pipe 19 to the auxiliary reservoir, thereby charging the auxiliary reservoir to brake pipe pressure.

From the passage 38, fluid under pressure flows through the passage 37 to the chamber 31 above the quick service diaphragm 32, thereby charging said chamber to brake pipe pressure. Fluid also flows from the chamber 50, below the quick action diaphragm 39, through the small port 49 in the diaphragm follower plate 41 to the chamber 48, thereby charging said chamber to brake pipe pressure. With the quick service diaphragm 32 in the normal position shown in the drawing, the valve 25 is pressed into engagement with seat rib 26 by the spring 27 and the quick service reservoir 4 is connected to the atmosphere through the restricted port 34.

With the slide valve 11 in normal release position, the brake cylinder 5 is open to the atmosphere by way of pipe 88, the old brake cylinder passage 89, cavity 90 in the slide valve 11, and the atmospheric port 91.

In order to effect a service application of the brakes, a series of light reductions in brake pipe pressure is effected by the operation of suitable means (not shown) carried by the locomotive, such, for instance, as the apparatus fully disclosed in the aforementioned Patent No. 1,974,954.

The initial reduction in brake pipe pressure produced by the apparatus on the locomotive, causes a corresponding reduction in fluid pressure in the chamber 31 above the quick service diaphragm 32 through the passages 37, 38, 81, 82, chamber 50, passages 51 and 83, chamber 61 and passage and pipe 63.

The pressure in chamber 48 can reduce only by flow through the small port 49, which is of such a flow area that the pressure in said chamber reduces at a slower rate than the pressure in chamber 31, and a fluid differential is thus established on the quick service diaphragm 32, which will cause said diaphragm to move upward. As the diaphragm thus moves, the pin 36 unseats the valve 25 against the opposing pressure of the spring 27 acting through the medium of the follower 75. It will here be noted that as the valve 25 is unseated, it is slidably guided within the chamber 24.

When the valve 25 is thus unseated, fluid is vented from the chamber 31 to the quick service reservoir 4 through passage 30, chamber 24, passage 33 and pipe 84. Since the brake pipe is in communication with chamber 31 through pipe and passage 63, chamber 61, passages 83 and 51, chamber 50, and passages 82, 81, 38 and 37, the venting of chamber 31 causes a local venting of fluid from the brake pipe, and since the triple valve piston chamber 79 is connected to the chamber 31 through the passages 80 and 37, fluid is also vented from the chamber 79.

Thus, the brake pipe is locally vented to the quick service reservoir 4 and the triple valve piston is moved to service application position and this action is reproduced serially on the cars of the train from the front to the rear.

Due to the relatively large area of the quick service diaphragm 32, the light weight of the parts, and the short movement required to unseat the quick service vent valve 25, the diaphragm will operate when only a light differential of pressures has been created between the chambers 31 and 48, so that a local reduction in brake pipe pressure is produced very quickly in response to the reduction in brake pipe pressure. Because of the shortness of the passages 80 and 37, the pressure of the fluid in chamber 79 will be reduced very quickly in response to the reduction of pressure in the diaphragm chamber 31 caused by the unseating of the valve 25.

On the other hand, by properly proportioning the flow area of the port 49, the diaphragm 32 can be made responsive to vent fluid from the brake pipe and from the triple valve piston chamber 79 only when the rate of reduction is such as to cause the necessary differential pressure to be created.

As a consequence, the quick service diaphragm 32 is rendered stable in that it is not responsive to fluctuations in brake pipe pressure, due to leakage from the brake pipe, and slight variations in brake pipe pressure, due to variations in the operation of the usual feed valve device. In other words, the quick service diaphragm 32 is responsive and only responsive, when the reduction in brake pipe pressure is at a desired predetermined rate.

It should here be noted, that the quick action diaphragm 39 will remain inoperative during a service rate of reduction in brake pipe pressure because the differential required to operate the quick service diaphragm 32 is not sufficient to operate the quick action diaphragm, due to the fact that the area of the quick action diaphragm is smaller than the area of the quick service diaphragm and because, in addition, the spring 73 acts to resist downward movement of the quick action diaphragm.

As soon as the rate of reduction in brake pipe pressure becomes less than the rate required to maintain the pressure differential necessary to hold the diaphragm 32 in its upper position, the spring 27 acts, through the medium of the follower 75, the valve 25 and the pin 36, to move the diaphragm downwardly until the valve engages the seat rib 26 and thereby cuts off the further venting of fluid from the brake pipe.

The successive waves of reduction in brake pipe pressure as produced by the operation of the apparatus on the locomotive, cause corresponding successive operations of the quick service diaphragm 32 and the valve 25, so that a succession of local reductions in brake pipe pressure is produced on each car of the train.

When the valve 25 seats on the seat rib 26, the fluid in the reservoir 4 is vented to the atmosphere at a rate as permitted by the restricted port 34, so that the pressure in said reservoir is reduced to provide for a further reduction in brake pipe pressure when the diaphragm 32 operates, at each successive reduction in brake pipe pressure, to unseat the valve 25 and thereby open communication from the brake pipe and the triple valve piston chamber to the quick service reservoir.

The volume of the reservoir 4 is made such as to give the desired brake pipe reduction, taking into consideration the volume of the brake pipe on the car.

The flow capacity of the restricted passage 34 may be such that the quick service reservoir 4 will not be completely vented between successive operations of the quick service mechanism. In this event, the succeeding local reductions in brake pipe pressure will be less in degree than the initial local reduction, it being desirable to provide a slightly heavier initial reduction in order to compensate for the displacement of the brake cylinder piston.

In effecting an application of the brakes, the triple valve piston 9 moves outwardly from normal release position, in which it is shown in the drawing, to service position, first closing the feed groove 85 around the piston and shifting the graduating valve 10 relative to the main slide valve 11 to uncover the service port 92 in the main slide valve and then shifting the main slide valve to service position, in which position fluid under pressure is supplied from the auxiliary reservoir 3 and connected valve chamber 13, through port 92, passage 89, and pipe 88 to the brake cylinder 5.

When it is desired to effect the release of the brakes after a service application, fluid under pressure is supplied to the brake pipe in the usual manner and the consequent increase in the pressure of the fluid in the triple valve piston chamber 79 causes the triple valve piston 9, and thereby the slide valves 10 and 11, to move inwardly toward release position.

On the cars at the rear end of the train, where the increase in brake pipe pressure is at a slower rate than on the cars at the head end of the train, the triple valve piston 9 and slide valves 10 and 11 will be brought to a stop in normal release position, as shown in the drawing, by the spring weighted retarded release stop 16 when the rear end of the piston stem 93 engages said stop. On the cars at the front end of the train, where, as before mentioned, the rate of increase in brake pipe pressure is at a faster rate than on the rear cars, the triple valve piston and slide valves do not remain in normal release position, but move farther inwardly to retarded release position against the opposing pressure of the retarded release spring 17.

With the triple valve parts in normal release position, the auxiliary reservoir is recharged with fluid under pressure from the brake pipe by way of the feed groove 85, which has been opened by the piston in its traverse inwardly, and fluid under pressure is vented from the brake cylinder 5 to the atmosphere by way of the pipe 88, passage 89, cavity 90 in the main slide valve 11 and the atmospheric port 91.

With the triple valve parts in retarded release position, the rear face of the triple valve piston 9 engages the end of the bushing 94, and fluid under pressure flows from the triple valve piston chamber 79 to the valve chamber 13 and connected auxiliary reservoir 3 at a restricted rate, through feed groove 85 and thence through a smaller feed groove 95 in the triple valve piston. The brake cylinder passage 89 is open to the cavity 90 in the main slide valve 11 and a retarded release cavity 96, which is connected to the cavity 90 through a choked connection 97, is in registration with the passage 91, so that the release of fluid under pressure from the brake cylinder is at a slower rate, as governed by the connection 97.

When, with the triple valve parts in retarded release position, the auxiliary reservoir pressure in valve chamber 13 is increased to substantially the pressure of fluid in the triple valve piston chamber 79, the retarded release spring 17, acting through the medium of the retarded release stop 16 and piston stem 93, will move the triple valve piston 9 and slide valves 10 and 11 to full release position.

The chamber 48 is recharged to brake pipe pressure through the small port 49, as in the initial charging. On the cars at the head end of the train, there would be a possibility of the chamber 48 being charged to a greater pressure than that normally carried in the brake pipe, which if permitted, would tend to cause the quick action mechanism to operate to effect an undesired emergency application of the brakes when the brake pipe pressure reduces to that normally carried upon the usual movement of the brake valve device from release to running position. This possibility of an overcharge in said chamber is eliminated in my present equipment for the reason that fluid under pressure in the chamber 48 is free to equalize into the valve chamber 13 by way of passage 52, past the check valve 53 and through passage 12, said passage 12 being uncovered by the main slide valve 11 in retarded release position.

The check valve 53 interposed in the communication between the chamber 48 and the valve chamber 13, is for the purpose of preventing back flow of fluid from the chamber 13 and connected auxiliary reservoir 3 to the chamber 48, in the event of the triple valve parts being in retarded release position when the brake pipe pressure is being reduced to effect a service application of the brakes. If it were not for the check valve, there would be an open communication through which fluid would flow from the chamber 13 and auxiliary reservoir to the chamber 48 when the triple valve parts are in retarded release position and a service reduction in brake pipe pressure is effected. With the volumes of the auxiliary reservoir 3 and valve chamber 13 added to that of chamber 48, the port 49 in the quick action diaphragm follower 41 would not permit fluid under pressure to flow from the chamber 48 to the brake pipe sufficiently fast to prevent fluid under pressure in said chamber 48 from causing the quick action diaphragm to move from the position in which it is shown in the drawing to emergency position. Consequently, an undesired emergency application of the brakes would be effected. By the use of the check valve 53, this undesired operation of the quick action mechanism is prevented.

The choke 54 in the passage 52 controls the rate of flow of fluid from the valve chamber 13 and connected auxiliary reservoir 3 to the chamber 48 in the event of the triple valve parts being in retarded release position and the check valve 53 in said passage being accidentally unseated when the brake pipe pressure is being reduced to effect a service application of the brakes. The port 49 being small, if the passage 52 were not choked, a differential would be created on the quick action diaphragm 39 which, if the triple valve were on a car located in the front portion of the train where the reduction in brake pipe pressure is at a fast rate, would cause the quick action diaphragm to move to emergency position and thereby cause an undesired emergency application of the brakes. By retarding the flow of fluid from the valve chamber 13 and the auxiliary reservoir to the chamber 48 by the use of the choke, the possibility of creating sufficient differential on the quick action diaphragm to move said diaphragm to emergency position when it is desired to effect a service application of the brakes, is reduced.

It will be noted that the passage 52 is lapped by the main slide valve 11 when said slide valve is in normal release position, as shown in the drawing. Thus, in this position, increased protection is provided against leakage from the valve chamber 13 to chamber 48 in the event the check valve 53 leaks, so that when brake pipe pressure is reduced to effect an application of the brakes, only fluid from the chamber 48 can flow back to the brake pipe through the port 49, and the volume of chamber 48 being small, the proper functioning of the apparatus in a service application of the brakes is not interfered with by flow of fluid under pressure into the brake pipe. Moreover, the above mentioned protection against leakage into chamber 48 protects against the valve 25 being held open longer than intended, because obviously if there is leakage into chamber 48, a longer time would be required to reduce the pressure of the fluid in said chamber, through the port 49, to an amount which would permit the diaphragm 32 to move downwardly to normal position, so as to permit the valve 25 to be seated, than if the chamber 48 were tight against leakage. Then too, the above mentioned protection against leakage into chamber 48 increases the aforementioned protection afforded by the choke 54 against an undesired emergency application in case the ball check valve 53 should be accidentally unseated and the slide valve 11 be in normal position when brake pipe pressure is being reduced to effect a service application of the brakes.

When it is desired to effect an emergency application of the brakes, a sudden reduction in brake pipe pressure is effected and this sudden reduction is effective in the chamber 50 below the quick action diaphragm 39. Since the port 49 in the quick action diaphragm follower 41 will only permit the flow of fluid from the chamber 48 at a relatively slow rate, a fluid pressure differential is created on the diaphragm 39 which causes the diaphragm to move downwardly.

As the diaphragm thus moves, it shifts the plunger 78 in the same direction and the plunger unseats the valve 70 against the opposing pressure of the spring 73 acting through the medium of the follower 74. It will here be noted that as the valve 70 is unseated, it is slidably guided within the bore 71 in the piston stem 58.

When the valve 70 is thus unseated, fluid under pressure flows through passage 76 from the quick action diaphragm chamber 50 to the piston chamber 77. Fluid under pressure thus supplied to the chamber 77 causes the piston 57 to move downwardly, and said piston, through the medium of its stem 58, moves the quick action vent valve 59 from its seat rib, so that fluid under pressure is now vented from the brake pipe by way of pipe and passage 63, quick action vent valve chamber 61, past the open vent valve 59, passage 67, chamber 68 and atmospheric passage 69.

The sudden reduction in brake pipe pressure being effective in the triple valve piston chamber 79 by way of passages 80, 37, 38 and 81, and the vented chamber 50, fluid at auxiliary reservoir pressure in valve chamber 13 causes the triple valve parts to move to emergency position, in which the piston 9 engages a gasket 98 interposed between the casing 6 and the cap 86, and in which an emergency port 99 registers with the brake cylinder passage 89, so that fluid under pressure is supplied from the auxiliary reservoir 3 to the brake cylinder 5 for applying the brakes.

Now, when fluid under pressure is substantially completely vented from the brake pipe and the chamber 48, the spring 65 acts to seat the vent valve 59 and the spring 73 acts to seat the valve 70. As the valve 70 is being seated, it moves the plunger 78, and thereby the diaphragm follower 41 and diaphragm 39, upwardly to the position in which they are shown in the drawing, against the light pressure of the spring 47.

To effect a release of the brakes after an emergency application, the brake pipe is again charged with fluid under pressure, which causes the triple valve parts to move to either normal release position or retarded release position, according to the rate of increase in brake pipe pressure. The auxiliary reservoir 3 is now charged with fluid under pressure from the brake pipe, and fluid under pressure is released from the brake cylinder 5 in the same manner as in effecting a release of the brakes after a service application.

It will be noticed that there is a groove 100 in the casing 55 which connects the piston chamber 77 to the chamber 68 which is open to the atmosphere when the piston 57 is in its normal position, as shown in the drawing. This is a leakage groove which will permit fluid, which may leak from the quick action diaphragm chamber 50 past the seated valve 70, to flow to the atmosphere, so that a pressure differential on the piston 57, due to such leakage, cannot be created, thus preventing unintentional operation of the piston 57 to open the vent valve 60 and effect a consequent emergency application of the brakes.

From the foregoing description, it will be seen that I have combined in a single compact and simple valve device a modified K triple valve, an improved quick service mechanism for locally venting fluid under pressure from the brake pipe and from the triple valve piston chamber and an improved quick action mechanism for locally venting fluid under pressure from the brake pipe and from the triple valve piston chamber to effect an emergency application of the brakes.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake equipment, the combination with a brake pipe, of a triple valve device operative upon a gradual reduction in brake pipe pressure for effecting a service application of the brakes and operative upon a sudden reduction in brake pipe pressure for effecting an emergency application of the brakes and comprising a casing, a quick service mechanism comprising a casing having a chamber normally charged with fluid at brake pipe pressure, a valve operative to vent fluid under pressure from the brake pipe to effect a quick service reduction in brake pipe pressure, a movable abutment subject to the opposing pressure of the brake pipe and said chamber and operative upon a reduction in brake pipe pressure to operate said valve, a quick action mechanism comprising a normally closed quick action vent valve operative to locally vent fluid under pressure from the brake pipe, a movable abutment operative by fluid under pressure for actuating said valve, a normally seated valve operative to supply fluid under pressure for actuating the last mentioned movable abutment, and a movable abutment subject to the opposing pressures of the brake pipe and said chamber and operative upon a sudden reduction in brake pipe pressure to operate said last mentioned valve.

2. In a fluid pressure brake equipment, the combination with a brake pipe, of a salvaged triple valve casing having an open ended chamber from which a quick action mechanism has been removed, a quick service mechanism comprising a casing section carried by the triple valve casing, said casing section having a chamber normally charged with fluid at brake pipe pressure, a valve operative to vent fluid under pressure from the brake pipe to effect a quick service reduction in brake pipe pressure, a movable abutment subject to the opposing pressures of the brake pipe and said chamber and operative upon a reduction in brake pipe pressure to operate said valve, a quick action mechanism comprising a casing section secured to said quick service section, a normally closed quick action vent valve included in the last mentioned casing section and operative to locally vent fluid under pressure from the brake pipe, a movable abutment operative by fluid under pressure for actuating said valve, a normally seated valve operative to supply fluid under pressure for actuating the last mentioned movable abutment, and a movable abutment subject to the opposing pressures of the brake pipe and said chamber and operative upon a sudden reduction in brake pipe pressure to operate the last mentioned valve.

3. In a fluid pressure brake equipment, the combination with a brake pipe, of a triple valve device comprising a salvaged triple valve casing and means mounted in said casing operative upon a gradual reduction in brake pipe pressure for effecting a service application of the brakes and operative upon a sudden reduction in brake pipe pressure for effecting an emergency application of the brakes, said triple valve casing having a passage which was formerly a quick service passage, a quick service mechanism comprising a casing section carried by said triple valve device, said quick service mechanism being subject to the opposing pressures of the brake pipe and a chamber and operative upon a gradual reduction in brake pipe pressure to vent fluid from the brake pipe to effect a local quick service reduction in brake pipe pressure, a quick action mechanism also carried by said triple valve device and subject to the opposing pressures of the brake pipe and said chamber and operative upon a sudden reduction in brake pipe pressure to vent fluid from the brake pipe to effect an emergency application of the brakes, a passage in said casing section connected to said chamber and registering with the old quick service passage in the triple valve casing, said passage being adapted to be connected to the auxiliary reservoir for permitting flow of fluid from said chamber to the auxiliary reservoir, said triple valve device having a position for establishing communication from said passage to the auxiliary reservoir, and a check valve in said passage to prevent back flow.

4. In a fluid pressure brake equipment, the combination with a brake pipe, of a quick service mechanism comprising means subject on one side to brake pipe pressure and subject on the other side to the pressure in a chamber supplied from the brake pipe, said means being operative upon a gradual reduction in brake pipe pressure on one side to establish a communication through which fluid under pressure is adapted to be vented from the brake pipe to effect a local quick service reduction in brake pipe pressure and being operative upon a reduction in fluid pressure in said chamber on the other side for closing said communication, a quick action mechanism associated with said quick service mechanism and comprising means subject on one side to brake pipe pressure and subject on the other side to the pressure in said chamber, said last mentioned means being operative upon a sudden reduction in brake pipe pressure on one side for establishing a second communication through which fluid under pressure is vented from the brake pipe, and means for controlling the rate of reduction in fluid pressure in said chamber.

5. In a fluid pressure brake, the combination with a brake pipe and a brake controlling valve device operated upon a reduction in brake pipe pressure for effecting an application of the brakes, of a chamber normally charged with fluid from the brake pipe, a movable abutment subject to the opposing pressures of the brake pipe and said chamber and means operated by said abutment upon a service rate of reduction in brake pipe pressure for venting fluid from the brake pipe, a second movable abutment subject to the opposing pressures of the brake pipe and said chamber, and means operated by said second abutment only upon an emergency rate of reduction in brake pipe pressure for venting fluid from the brake pipe.

6. In a fluid pressure brake, the combination with a brake pipe and a brake controlling valve device operated upon a reduction in brake pipe pressure for effecting an application of the brakes, of a chamber normally charged with fluid from the brake pipe, a movable abutment subject to the opposing pressures of the brake pipe and said chamber and means operated by said abutment upon a service rate of reduction in brake pipe pressure for venting fluid from the brake pipe, a second movable abutment and a valve operable by said abutment for controlling the venting of fluid from the brake pipe, and cooperating guiding means associated with said abutments for maintaining said abutments in alignment.

7. In a fluid pressure brake, the combination with a brake pipe and a brake controlling valve device operated upon a reduction in brake pipe pressure for effecting an application of the brakes, of a chamber normally charged with fluid from the brake pipe, a movable abutment subject to the opposing pressures of the brake pipe and said chamber and means operated by said abutment upon a service rate of reduction in brake pipe pressure for venting fluid from the brake pipe, a second movable abutment and a valve operable by said abutment for controlling the venting of fluid from the brake pipe, a stem carried by the first mentioned abutment, and a hollow stem carried by the second mentioned abutment and having a slidable engagement with the first mentioned stem for maintaining said abutments in alignment.

8. In a fluid pressure brake equipment, the combination with a brake pipe and an auxiliary reservoir, of valve means subject to the opposing pressures of the brake pipe and auxiliary reservoir for controlling the application and release of the brakes and having associated therewith a chamber having connection with a passage adapted to be connected to the auxiliary reservoir for permitting the flow of fluid from said chamber to the auxiliary reservoir, a check valve in said passage for preventing the back flow, and means for retarding the rate of back flow in the event of the check valve failing to prevent back flow 9. In a fluid pressure brake equipment, the combination with a brake pipe and a triple valve device subject to the opposing pressures of the brake pipe and auxiliary reservoir and operative upon a gradual reduction in brake pipe pressure to effect a service application of the brakes, of a quick service mechanism associated with said triple valve device and subject to the opposing pressures of the brake pipe and a chamber and operative upon a gradual reduction in brake pipe pressure to vent fluid under pressure from the brake pipe to effect a local quick service reduction in brake pipe pressure, a passage connected to said chamber and adapted to be connected to the auxiliary reservoir for permitting flow of fluid from said chamber to the auxiliary reservoir, said triple valve device having a position for establishing communication from said passage to the auxiliary reservoir, and a check valve in said passage for preventing back flow.

10. In a fluid pressure brake equipment, the combination with a brake pipe and a triple valve device subject to the opposing pressures of the brake pipe and auxiliary reservoir and operative upon a gradual reduction in brake pipe pressure to effect a service application of the brakes, of a quick service mechanism associated with said triple valve device and subject to the opposing pressures of the brake pipe and a chamber and operative upon a gradual reduction in brake pipe pressure to vent fluid under pressure from the brake pipe to effect a local quick service reduction in brake pipe pressure, a passage connected to said chamber and adapted to be connected to the auxiliary reservoir for permitting flow of fluid from said chamber to the auxiliary reservoir, said triple valve device having a position for establishing communication from said passage to the auxiliary reservoir, and a choke in said passage adapted to restrict the rate of back flow.

11. In a fluid pressure brake equipment, the combination with a brake pipe and a triple valve device subject to the opposing pressures of the brake pipe and auxiliary reservoir and operative upon a gradual reduction in brake pipe pressure to effect a service application of the brakes, of a quick service mechanism associated with said triple valve device and subject to the opposing pressures of the brake pipe and a chamber and operative upon a gradual reduction in brake pipe pressure to vent fluid under pressure from the brake pipe to effect a local quick service reduction in brake pipe pressure, a passage connected to said chamber and adapted to be connected to the auxiliary reservoir for permitting flow of fluid from said chamber to the auxiliary reservoir, said triple valve device having a position for establishing communication from said passage to the auxiliary reservoir, a check valve in said passage for preventing the back flow of fluid from said reservoir to the chamber, and a choke in said passage adapted to restrict the rate of back flow in the event of the check valve failing to prevent back flow.

ELLERY R. FITCH.